United States Patent

[11] 3,538,956

[72] Inventors Clarence H. Helbing,
Shelbyville, Ind., Richard J. Bennett,
Pittsburgh, Pa., Frank E. Wilson,
Shelbyville, Ind., and Alphonso C. Pecora,
Allison Park, and Malcolm Hay, Jr., and
Winfield T. Irwin, Pittsburgh, Pa.
[21] Appl. No. 784,456
[22] Filed Dec. 17, 1968
[45] Patented Nov. 10, 1970
[73] Assignee PPG Industries, Inc.
Pittsburgh, Pennsylvania
a corporation of Pennsylvania

[54] FLEXIBLE DUCT WITH INTERLOCKING-TYPE COUPLING
11 Claims, 4 Drawing Figs.
[52] U.S. Cl.................................................... 138/120,
285/53; 138/100, 138/129
[51] Int. Cl........................................................ F16i 11/00,
F16i 9/22

[50] Field of Search........................................... 138/120,
109; 285/53, 235, 237, 369, 370, 423;
138/(Inquired); 285/(Inquired)

[56] References Cited
UNITED STATES PATENTS
656,667 8/1900 Schmid......................... 285/370X
2,349,016 5/1944 Stephens..................... 138/120X
FOREIGN PATENTS
1,118,044 6/1968 Great Britain................ 138/109

Primary Examiner—Edgar W. Geoghegan
Attorney—Chisholm and Spencer

ABSTRACT: A flexible insulated duct comprising a wire helix wrapped with insulating material, encased in a fluid-impermeable sleeve and terminated with interlocking-type connector members. The interlocking-type connector members are provided with coupling means that permit rapid and positive interlocking of adjacent duct sections, yet means capable of being manually manipulated to permit ready uncoupling of adjacent duct sections, if desired.

Patented Nov. 10, 1970
3,538,956
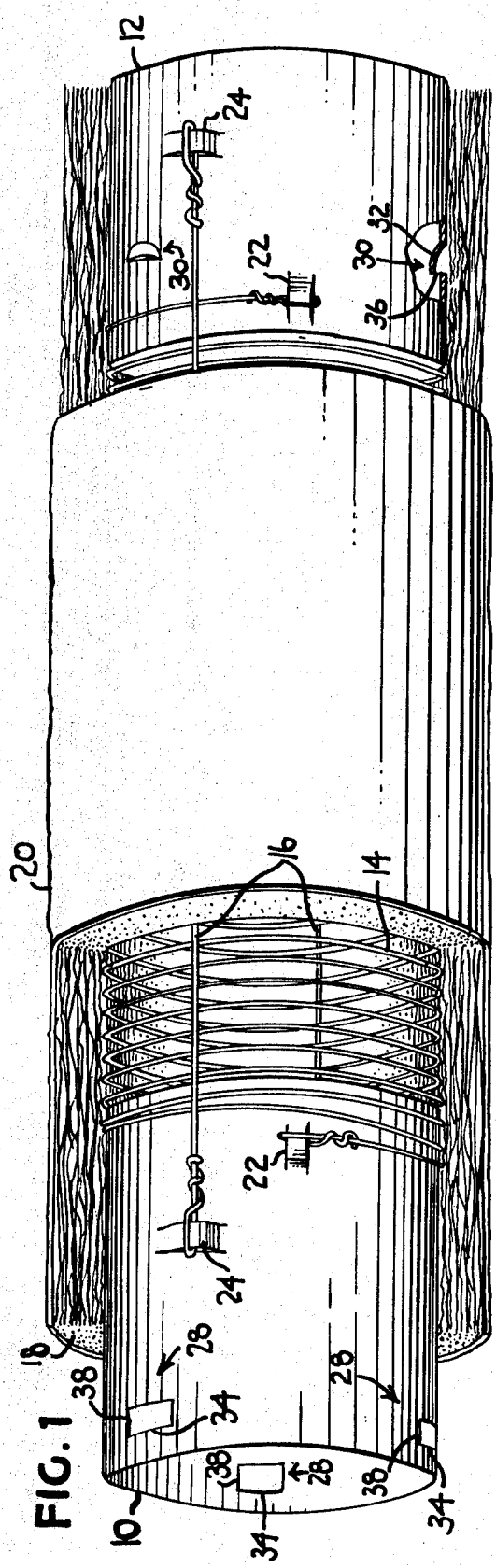
FIG. 1
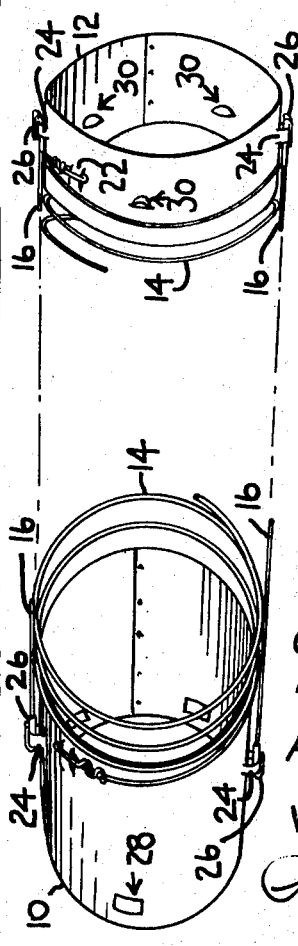
FIG. 2
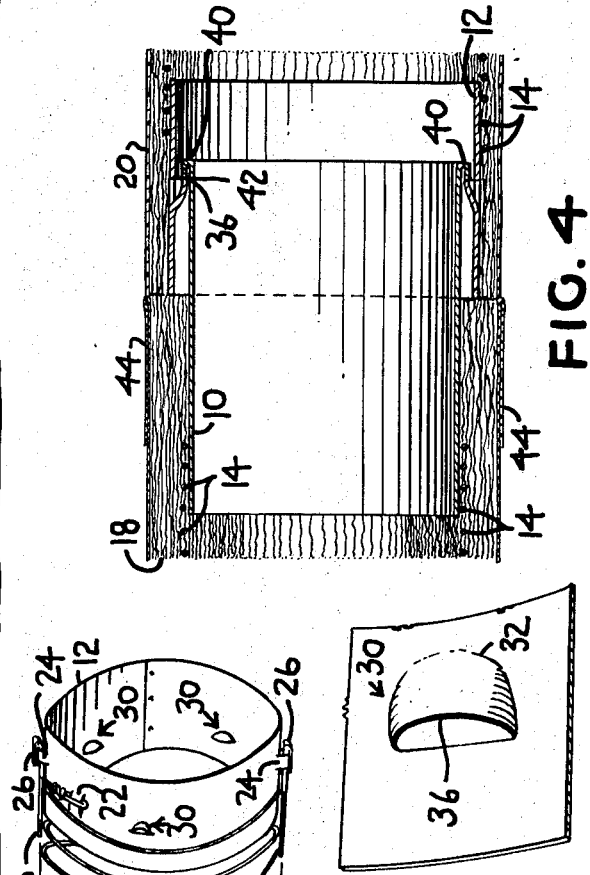
FIG. 3
FIG. 4
INVENTORS
CLARENCE H. HELBING
RICHARD J. BENNETT
FRANK E. WILSON
ALPHONSO C. PECORA
MALCOLM HAY JR.
WINFIELD T. IRWIN
ATTORNEYS

FLEXIBLE DUCT WITH INTERLOCKING-TYPE COUPLING

This invention relates to flexible insulated duct for the conduction of gaseous fluids in commercial or residential heating and/or air conditioning systems. More specifically, the present invention relates to flexible insulated duct comprised of a helically wound wire wrapped with porous insulating material, encased in a flexible, fluid-impermeable sleeve and terminated with interlocking-type sheet metal connectors The present invention is an improvement over flexible duct constructions such as those disclosed in copending continuation-in-part U.S. Pat. application Ser. No. 701,301, entitled "Flexible Duct", filed Jan. 29, 1968 by Malcolm Hay, Jr., now U.S. Pat. No. 3,502,114, issued March 24, 1970 and copending U.S. Pat. application Ser. No. 760,171, entitled "Longitudinally Reinforced Flexible Duct", filed Sept. 17, 1968 by William L. Runshe and Clarence H. Helbing.

As disclosed in the aforesaid copending applications, flexible duct constructions have previously been proposed wherein individual sections of flexible duct are provided during their manufacture with a male sheet metal connector member at one end and a female sheet metal connector member at the other end. As thus constructed and made available in the field, these individual sections of flexible duct can be readily joined to one another or to other ducts to produce a complete duct installation.

However, in the past, the accepted procedure for joining these flexible duct sections merely followed the conventional procedure used in joining sections of sheet metal duct. Briefly, this procedure involved interfitting a male connector member on one duct section with a female connector member on another duct section, drilling through both of the assembled connectors at one or more common points about their peripheries and fastening the connector members together by inserting a sheet metal screw through each drilled hole. Generally, in flexible duct systems, the joint was then completed by applying a wrapping of tape around exterior portions of the joined duct sections to assure the fluid impermeability of the joint.

The foregoing procedure for joining duct sections when used in connection with flexible insulated duct has been found to possess a number of disadvantages. Principal among these disadvantages is that once the flexible duct installation is completed, it is impossible to tell whether the connector members have been screwed together. As will be more apparent hereinafter, unlike the case with metal ducts, the screws joining flexible duct connector members are completely concealed and inaccessible for inspection in the completed installation. Accordingly, if screws are left out and joints are weakened thereby, the resultant structural deficiency of the duct system can go completely unnoticed until a failure occurs.

In addition to the above, considerable expenditures in time, material and labor are incurred by the hole drilling and screw fastening operations of the prior art procedure. Moreover, these expenditures are substantially repeated each time it is found necessary to disconnect and/or reconnect sections of duct when modifying or repairing the duct system.

The present invention proposes to overcome all of the aforementioned deficiencies of prior art flexible duct constructions by providing flexible insulated ducts with interlocking-type connector members having coupling means to permit rapid and positive interlocking of adjacent duct sections, yet means capable of being manually manipulated to permit ready uncoupling of adjacent duct sections, if desired.

The foregoing and other objects, features and advantages of this invention will become more apparent when considered in connection with the accompanying drawing, in which:

FIG. 1 is a perspective view, partly broken away, of a short section of flexible insulated duct provided with connector members embodying the principles of this invention;

FIG. 2 is a perspective view, similar to FIG. 1, of a duct embodying the principles of this invention with its insulating material and flexible outer sleeve removed for the sake of clarity;

FIG. 3 is an enlarged perspective of one of the preferred structural details of the present invention; and FIG. 4 is a cross-sectional view of a joint between adjacent duct sections showing details of an alternate preferred embodiment of this invention.

Depicted in the drawing are flexible duct constructions embodying the principles of the present invention. Broadly, the flexible duct constructions shown are composed of interlocking-type male and female connector members 10 and 12, a wire helix 14, a blanket of insulating material 18 and a flexible outer sleeve 20. As shown in FIGS. 1 and 2, longitudinal reinforcement 16 may also be employed in the construction of the flexible duct of this invention to enhance the axial tensile strength of the duct.

With particular reference to FIGS. 1 and 2, the manufacture of the duct therein shown proceeds by mounting the pair of interlocking-type connector members 10 and 12 at spaced locations on a collapsible mandrel (not shown). An end of the wire forming the wire helix is then affixed to one of the connectors, e.g., the female connector member 12, and is helically wound around a length of the connector, along the length of the mandrel (not shown) and around a length of the other connector member, e.g., the male connector member 10. During winding, an adhesive coating is continuously applied all along the length of the wire forming the helix 14. Upon reaching the desired length, the wire is terminated and the free end is affixed to the other connector member, e.g., the male connector member 10.

One or more flexible cordlike tension members 16 are then placed over the wire helix and affixed at their ends to connector members 10 and 12. Preferably, at least a pair of tension members 16 are used and are affixed to the connector members 180° apart so that the reinforcement is parallel to the axis of the helix. A blanket of insulating material is next sprayed with an adhesive that covers a sufficient portion of one surface thereof to provide at least one circumferential wrap around the wire helix. The insulating blanket is then wrapped convolutely or circumferentially around the connectors 10 and 12, the wire helix 14 and the longitudinal reinforcement 16 so that the adhesive-coated surface faces the interior of the duct. Preferably, the insulating blanket covers substantially all of the female connector 12 and only a portion of the male connector 10. After wrapping, the trailing end of the insulating blanket is preferably secured in place by means of staples (not shown). An outer sleeve of flexible fluid-impermeable material 20 is then pulled over the insulating blanket and the mandrel is collapsed to release the finished section of duct.

In the practice of the present invention, many different materials can be used to produce the helix element of the duct. As disclosed in the aforementioned copending applications, the helix material should be resistant to atmospheric corrosion, should possess sufficient strength and rigidity to prevent collapse of the duct in a radial direction upon application of moderate pressures, but should not be so strong as to adversely affect the flexibility of the duct. The helix material should also be sufficiently elastic to cause spring-back of the duct to its original shape as soon as external deforming pressures on the duct are relaxed. The desired helix material should exhibit, then, a balance of good flexibility, elasticity and strength. Any material roughly conforming to the form of a slender rod or wire composed of metal, plastic or a combination thereof, having a circular or noncircular cross section and exhibiting a suitable balance of these characteristics can be used.

Galvanized hard-drawn steel spring wire has been found to be an excellent helix material. For ducts 9 inches or less in inside diameter, a galvanized wire of 0.041 inch in diameter is preferred. For ducts from 10 to 18 inches in inside diameter, a wire 0.051 inch in diameter should be used. In all duct sizes, the preferred spacing of the convolutions of the wire helix is ¾ of an inch from center to center, although the spacing may range from ¼ to 1 ¼ inch and still produce a suitable duct.

FIGS. 1 and 2 show the wire helix fastened to the interlocking-type connectors or couplings 10 and 12. In accordance with the aforesaid copending applications, connectors or couplings 10 and 12 are provided with tab means, hereinafter described, for fixing and stabilizing the ends of the wire helix 14 and the longitudinal reinforcement 16. In each of the embodiments shown in the drawing, the male connector 10 and the female connector 12 both comprise a galvanized sheet metal sleeve or coupling of cylindrical cross section. For suitable resistance to atmospheric corrosion, the zinc-coated (galvanized) sheet steel and steel wire used in the construction of the duct of this invention preferably has a uniform zinc coating of about 0.3 ounce per square foot of surface area coated (0.6 ounce per square foot of sheet), as determined by the Standard Method of Test for Weight of Coating on Zinc-Coated (Galvanized) Iron or Steel Articles, ASTM Designation A90-53.

Projecting from the outer surface of each connector, there is shown an open tab or loop 22 that forms an integral part of the connector and is preferably produced by a simple stamping operation, such as by punch-pressing a small portion of the connector material outwardly from the remainder of the connector material. As shown, the ends of the wire helix are inserted through the loops 22 and the wire is then twisted on itself to firmly secure the ends of the wire to the connectors and thereby stabilize the ends of the wire helix.

Also projecting from the outer surface of the connectors are open tabs or loops 24 that provide means for attaching longitudinal reinforcement 16 to the connectors. During manufacture of the duct, these tabs or loops 24 are longitudinally aligned on the mandrel so that the reinforcement 16 is subsequently attached to the connectors parallel to the axis of the duct. Shown in FIGS. 1 and 2 are two longitudinal reinforcement members 16. For this purpose, as best shown in FIG. 2, a pair of tabs or loops 24 spaced 180° apart are provided on each of the connectors.

One preferred longitudinal reinforcement 16 that is usable with all duct sizes is galvanized steel wire of 0.041 inch diameter. As shown in FIG. 1, the ends of the wire reinforcement 16 are inserted through the loops 24 and the wire is then twisted on itself to firmly secure the ends of the wire to the connectors, thereby longitudinally reinforcing the wire helix-connector complex against tensile forces tending to separate the connectors and straighten the wire forming the helix 14.

Illustrated in FIG. 2 is an alternative arrangement to that shown in FIG. 1. Here, in lieu of steel wire, the preferred longitudinal reinforcement 16 is a nominal one-eighth inch fiber glass cord terminated with aluminum tubing or sleeves 26. In the embodiment shown, the sleeves 26 are about 2 inches in length and are compressed or flattened to firmly secure the sleeves around the ends of the cord. The sleeves are then inserted through loops 24 on connector members 10 and 12 and bent into a hook shape to clinch the sleeves around loops 24, thereby securing the cord reinforcement to the connector members.

With respect to each of the flexible cordlike tension members, the particular wire and wire size, as well as the particular cord material, cord size and cord attachment means selected, should each be chosen with a view towards maintaining the flexibility of the duct, i.e., its bendability and twistability, while providing the duct with sufficient longitudinal strength to withstand at least a 50-pound axial tensile load for 24 hours. Moreover, the materials used in the tension members should each be chosen so that they are resistant to atmospheric corrosion. Also, these materials should be used only in combinations that would not cause any detrimental galvanic action which would adversely affect any part of the system formed from such materials.

In accordance with the present invention, connector members 10 and 12 are interlocking-type members that are provided with coupling means which permit rapid and positive interlocking of adjacent duct sections, yet means capable of being manually manipulated to permit ready uncoupling of adjacent duct sections, if desired.

As shown in FIGS. 1 and 2, one preferred embodiment of the present invention contemplates providing the male connector member 10 with coupling means comprising a plurality of slots or apertures 28, and the female connector member 12 with coupling means comprising an equivalent number of ears or dimples 30 (FIG. 3) that are struck up from the sheet metal so that they project inwardly toward the interior of the connector member 12. In the embodiment illustrated, three generally rectangular slots 28 are provided on male connector 10. Each slot 28 is lineally spaced an equal distance from the free end of connector 10 and angularly spaced an equal distance from each other, i.e., 120° apart. Similarly, female connector 12 is provided with three essentially semihemispheroidal shaped ears 30, each of which is lineally spaced an equal distance from the free end of connector 12 and angularly spaced an equal distance from each other. As shown, slots 28 are preferably disposed closer to the free end of connector 10 than ears 30 are disposed relative to the free end of connector 12.

As will be apparent, male connector member 10 is slightly smaller in exterior circumference than the interior circumference of female connector member 12. Accordingly, when a male connector 10 on one duct section is inserted into a female connector 12 on another duct section, the free end of connector 10 cams over the inclined surfaces 32 of ears 30 until the leading edges 34 of slots 28 drop behind the vertical trailing edges 36 of ears 30. In this position, slots 28 are disposed in circumscribing relation about ears 30 and male connector 10 is positively interlocked with female connector 12. The interaction between the leading edges 34 of slots 28 and the vertical railing edges 36 of ears 30 prevents direct axial disengagement of the connector members. However, should it thereafter be desired to remove male connector 10 from female connector 12, this can be readily accomplished by simply rotating one connector member with respect to the other so that side edges 38 of slots 28 cam over the inclined surfaces 32 of ears 30 to a position where slots 28 are clear of ears 30 and the connector members can then be longitudinally disengaged.

Shown in FIG. 4 is an alternative embodiment of this invention. In this embodiment, the female connector member 12 is constructed in the same manner as that described above, but the male connector member 10 is provided with an outside rolled hem or U-shaped, reverse lip 40 at its free end in lieu of slots 28. Lip 40 extends completely around the periphery of the free end of male connector 10. Accordingly, when it is desired to connect a male connector member 10 and a female connector member 12, the outside roll of metal or lip 40 on the male connector 10 is arranged to slip over the slope on the oncoming side of ears 30 on the female connector 12 to a position where the sharp edge 42 of lip 40 snaps behind the sharp edges 36 on the trailing edge or opposite side of ears 30. In this position, the connector members 10 and 12 are securely locked together.

As will be understood, in the above embodiment of this invention disengagement of the connector members 10 and 12 is accomplished by exerting a slight compressive force on the exterior of male connector 10 and simultaneously exerting a slight rocking motion so that lip 40 is sequentially moved from its position behind each of the ears 30. Once lip 40 is moved forward of each of the ears 30, the connector members 10 and 12 can be readily separated.

In the practice of the present invention, the adhesive applied to the wire helix and sprayed on the blanket prior to fabrication to bond the helix and connector members to the insulating blanket may be any conventionally used adhesive, although a nonflammable type is preferred for safety considerations. Nonflammable adhesives are preferred also because they are frequently required by local building codes and ordinances. The adhesive used should remain flexible, even after setting, so that the duct may be flexed without permanently damaging the bond, as may occur during installation of the duct. The adhesive used should also have a composition which does not attack or corrode the material of the insulating blanket.

The preferred adhesive is a neoprene elastomer and resin adhesive. Other suitable adhesives that may be used are fully disclosed in the aforementioned U.S. Pat. application, Ser. No. 701,301. Also, as disclosed in said application, the same adhesive may be used on the blanket material as that applied to the wire helix. The only modification made is that the adhesive is thinned somewhat so that it may be easily sprayed on the blanket composite.

The insulating material preferably employed in the improved duct of the present invention is a composite of individual glass fibers and glass fiber strands bonded together by a thermosetting resinous binder, and in which each component is randomly oriented and uniformly distributed throughout the other. This insulating material and its method of manufacturer are fully disclosed in the aforesaid copending U.S. application, Ser. No. 701,301, the disclosure of which is incorporated herein by reference.

The wire helix, since it is dimensionally unstable in the longitudinal direction, must be firmly bonded to the insulating blanket to maintain the spacing between convolutions. Furthermore, the bond between the wire helix and the insulating blanket must be sufficiently strong to permit flexing and unflexing of the duct without collapse or without decreasing the internal cross-sectional area of the duct, to avoid restricting fluid flow. The strand-fiber composite blanket material mentioned above develops the required strength in the duct because of its superior ability to adhere its mass to the helical wire element of the duct while at the same time maintaining a strong internal bond between the various components of the blanket material.

The flexible sleeve material employed with this invention can comprise any flexible substantially nonexpandable material such as polyvinyl chloride. The preferred sleeve material is a 3.0—3.35 mil thick extruded polyvinyl chloride tubing. Other materials, such as a polyvinylene chloride film, a laminated polyvinyl chloride film and fiber glass scrim fabric material and various neoprene-impregnated glass cloths may also be used.

As will be apparent from FIGS. 1 and 3, it is desirable that the finished duct section have the insulating material and flexible sleeve essentially completely covering the female connector 12 and only partly covering the male connector 10, so that when joined with other duct sections or the like, there is provided a continuous cylindrical covering of insulating material and sleeve material about the duct. In accordance with the present invention, the distance from the free end of female connector 12 to the trailing edges 36 of ears 30 is slightly greater than the distance from the edge of the insulating material 18 on male connector 10 to either the leading edges 34 of slots 28 or the sharp edge 42 of lip 40. Accordingly, coupling means 28 and 30 or coupling means 40 and 30 are located such that, when connector members 10 and 12 are interlocked, the abutting edges of insulating material covering the respective connector members are slightly compressed to assure a continuous covering about the duct.

Additionally, the flexible sleeve material 20 may be somewhat longer than the insulating material 18, and the extra length of material 44, as shown in FIG. 4, may be folded back on itself at one end of the duct section, so that by unfolding this extra length there is provided an overlap of sleeve material 20 at each joint between adjacent duct sections. This lap joint of sleeve material is preferably taped to enhance the desired fluid and vapor impermeability of flexible duct construction.

It will be apparent from the foregoing that the present invention provides an improved flexible duct construction having interlocking-type connector members that are provided with coupling means which permit rapid and positive interlocking of adjacent duct sections, yet means capable of being manually manipulated to permit ready uncoupling of adjacent duct sections, if desired. In accordance with the practice of this invention, any uncertainty that might otherwise have existed as to whether flexible duct sections are securely joined together is completely avoided. The practice of this invention positively assures providing a strong joint between adjacent duct sections and thereby greatly enhances the reliability and structural integrity of the complete duct system. Also, the practice of this invention avoids much of the expenditures in time, material and labor that were incurred in the practice of the prior art procedure of joining flexible duct sections together with screws. In addition to the above, the duct of the present invention retains the desired flexibility, good air flow characteristics, competitive price and desirable acoustical characteristics of earlier flexible duct designs.

While the preferred embodiments of this invention have been illustrated and described, it will be understood that various changes and modifications may be made within the scope of the appended claims without departing from the spirit of the invention.

We claim:

1. A flexible insulated duct comprising a helix wrapped with insulating material, encased in a flexible fluid-impermeable sleeve and terminated with interlocking-type connector members.

2. The flexible insulated duct of claim 1 wherein the interlocking-type connector members are provided with coupling means to permit rapid sand positive interlocking of adjacent duct sections, yet means capable of being manually manipulated to permit ready uncoupling of adjacent duct sections, if desired.

3. The flexible insulated duct of claim 2 wherein the interlocking-type connector members are male and female sheet metal connector members and said coupling means on said female connector member comprises a plurality of ears that are struck up from the sheet metal so that they project inwardly toward the interior of said female connector member.

4. The flexible insulated duct of claim 3 wherein said ears are essentially semihemispheroidal in shape.

5. The flexible insulated duct of claim 3 wherein said ears have inclined leading and side surfaces formed integrally with said female connector member and a vertical trailing edge that is displaced from the sheet metal of said female connector member.

6. The flexible insulated duct of claim 3 wherein said coupling means on said male connector member comprises a plurality of apertures that are in substantial longitudinal alignment with said ears on said female connector member.

7. The flexible insulated duct of claim 6 wherein said apertures are essentially rectangular in shape.

8. The flexible insulated duct of claim 3 wherein said coupling means on said male connector member comprises an outside disposed, U-shaped reverse lip on the free end of said male connector member that terminates in a sharp edge.

9. The flexible insulated duct of claim 6 wherein the insulating material essentially completely covers the outer surface of said female connector member and partially covers the outer surface of the male connector member, and the distance from the free end of said female connector member to the trailing edges of said ears is slightly greater than the distance from the edge of the insulating material on said male connector member to the leading edges of said apertures.

10. The flexible insulated duct of claim 8 wherein the insulating material essentially completely covers the outer surface of said female connector member and partially covers the outer surface of the male connector member, and the distance from the free end of said female connector member to the trailing edges of said ears is slightly greater than the distance from the edge of the insulating material on said male connector member to said sharp edge on said U-shaped lip.

11. A flexible insulated duct comprising a helix wrapped with a coherent, strand-individual fiber composite insulating material, encased in a flexible fluid-impermeable sleeve and terminated with longitudinally reinforced connector members, said connector members being male and female interlocking-type connector members that are provided with coupling means to permit rapid and positive interlocking of adjacent duct sections, yet means capable of being manually manipulated to permit ready uncoupling of adjacent duct sections, if desired.